METHOD FOR MAKING CIRCUIT CONNECTIONS TO INTERNAL LAYERS OF A MULTILAYER CIRCUIT CARD AND CIRCUIT CARD PRODUCED THEREBY

Filed Dec. 24, 1964

INVENTORS
KARL HINCK
LOWELL G. ALLEN
ROBERT C. PAULSEN

BY Sughrue, Rothwell, Mion, Zinn & Macpeak
ATTORNEYS

United States Patent Office 3,243,498

Patented Mar. 29, 1966

3,243,498

METHOD FOR MAKING CIRCUIT CONNECTIONS TO INTERNAL LAYERS OF A MULTILAYER CIRCUIT CARD AND CIRCUIT CARD PRODUCED THEREBY

Lowell G. Allen, Hopewell Junction, and Karl Hinck and Robert C. Paulsen, Poughkeepsie, N.Y., assignor to International Business Machines Corporation, New York, N.Y., a corporation of New York Filed Dec. 24, 1964, Ser. No. 420,969

8 Claims. (Cl. 174—68.5)

This invention relates to improvements in the art of multilayer laminated circuit cards and more particularly relates to making selective connection to the internal layers of such circuit cards.

In the production of electrical circuits for various purposes, such as used in electronic equipment such as data processing machines and the like, a problem of standardization is presented. It is, of course, desirable to standardize as much as possible the different circuit cards used, but also a very large number of different circuits are required.

In recent years so-called printed circuits have evolved from single-sided cards to double-sided cards and now to multilayer cards with electrical conductors in the internal layers being connected to each other and to outer layers in order to provide the required circuit connections.

Multilayer circuit cards or boards in which the internal layers are used for signal and voltages as well as ground have allowed a very high density of electrical connections but, on the other hand, they require extensive time to fabricate in order to provide a specific or "tailor-made" circuits.

In multilayer circuit cards as are now known in the art, the circuit configurations on the internal layers are called internal planes and are used either for voltage distribution or signal transmission. Connections are made from the internal planes to the outer surfaces of the card by electroplating the walls of holes extending through the laminated card. The pattern etched into the internal planes determines whether the plating contacts the plane or not. The disadvantage of this arrangement is that once the etching pattern for the internal planes has been established, the connections to them cannot be changed and a separate set of internal planes must be provided for each circuit. It is most economical to mass-produce circuit cards by standardizing an internal plane pattern, and having the card completed up to the point of etching the circuit configuration, i.e. providing the circuit personality, on the surface of the card. However, with some of the holes already connected to internal planes, the personality which may be laid out on the faces of the card is restricted enough to limit the number of circuits which may be placed on the card. This restriction increases with the size of the card and the number of holes connected to the internal planes of the card, and the interconnecting lines of the personality tend to become long and zigzagged. This invention eliminates these problems enumerated above by making it possible to selectively connect to the internal planes after they have been etched and the card has been laminated.

Thus, this invention solves the difficult problem of standardization in the multilayer circuit card art while still allowing a very large number of different circuits to be made from connections to internal layer circuit configurations by providing a number of standard internal planes or layers for multilayer circuit board each having a circuit pattern or configuration by selectively connecting to certain ones of these planes as desired, depending upon the size of holes provided through the planes and the distance of conductors in the circuit pattern in the planes from the axis of the holes. Thus this invention allows the number of standard internal voltage and ground planes for a multilayer circuit board to be reduced by a considerable amount, while still allowing for the fabrication of a very large number of different circuit configurations by the selective connection of the various circuit planes, thereby eliminating fabrication of a different internal circuit plane for each specific circuit. The number of specific different internal planes can be reduced by a factor of 10 to 1 to the number of standard internal planes by utilizing the principles and circuit boards of this invention.

In view of the foregoing, this invention includes among its objects a reduction in time and expense of producing multilayer circuit boards and solving of a problem of standardization by providing for selective connection to standard internal layers of a multilayer circuit board.

Other objects of the invention will be pointed out in the following description and claims and illustrated in the accompanying drawing, which discloses, by way of example, the principle of the invention and the best mode which has been contemplated of applying that principle.

Figure 1:
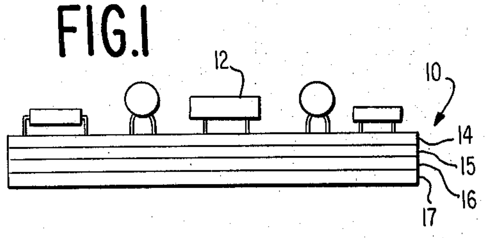
FIG. 1 is a side elevation view of the multilayer circuit board or card of this invention.

Referring to the drawing, the printed circuit board or card 10 of this invention is of the laminated multilayer type and includes electrical and electronic components 12 schematically shown which may be attached thereto in different circuits as provided by conductors in the various layers of the laminated circuit board 10. The circuit board in the illustrated embodiment includes layers 14, 15, 16, 17 laminated together and formed by a suitable insulating material base such as epoxy glass having an electrically conductive surface material thereon such as etched copper sheets.

Figure 2:
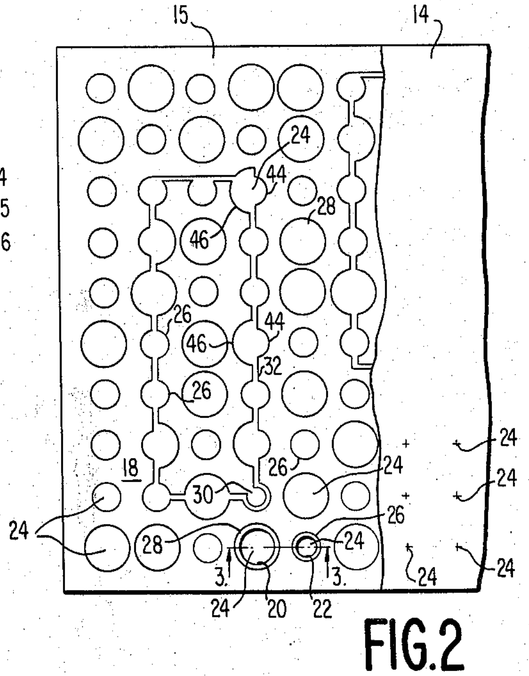
FIG. 2 is a top plan view of a portion of the circuit board or card with the components removed showing the top layer and an internal layer having a conductive pattern providing a portion of a circuit thereon.
Figure 3:
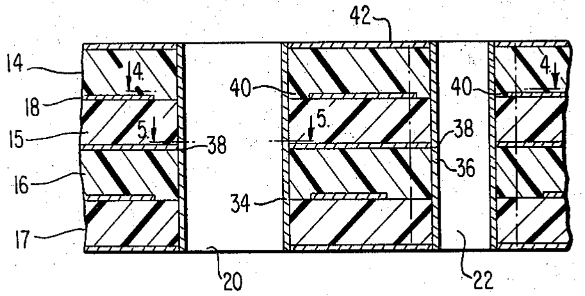
FIG. 3 is a partial sectional view taken along line 3—3 of FIG. 2.

As shown in FIG. 2, the conductive copper sheet material 18 on layer 15 is etched in a predetermined pattern or configuration. This pattern may be etched in the copper sheet prior to laminating the layers and there may be a suitable different pattern for each of a standard number of internal layers or planes. A plurality of large holes 20 and small holes 22 of selectively determined size are drilled through the laminated layers on equally spaced centers or axes 24, 24.

The conductive pattern 18 comes close to the centers or axes of the hole at certain points as indicated at 26 to make small diameter conductive pattern voids on some of the axes, and on other of the axes the conductive material pattern extends farther from the center of the axes as at 28 to form larger diameter conductive material voids from the center of the holes or axes 24. A further alternative is that the conductive pattern around an axis is a semicircle void 44 of a diameter equal to void 26 and a semicircle void 46 of a dimension equal to void 28. In some cases the conductive material extends to the centers 24 as shown at 30 in FIG. 2. The conductive pattern may also have etched-out lines or voids between the hole centers 24 as indicated at 32 in FIG. 2.

By selectively choosing the desired size hole, either small diameter 22 or large diameter 20, to be drilled on each of the centers 24 selective circuit connections may be made depending on whether or not the hole intersects the conductive pattern of the different layers. The small diameter hole 22 is smaller in diameter than the small diameter pattern void 26 but, of course, would intersect the conductive pattern at 30 when drilled on that axis. In a similar manner the large diameter hole 20 is larger in diameter than the conductive pattern void 26 but smaller in diameter than conductive pattern void 28, therefore, when the hole 20 is drilled on a center which has a large diameter void 28, it will not make contact but will allow contact to be made if drilled on a center 24 having a small diameter void 26.

Figure 4:
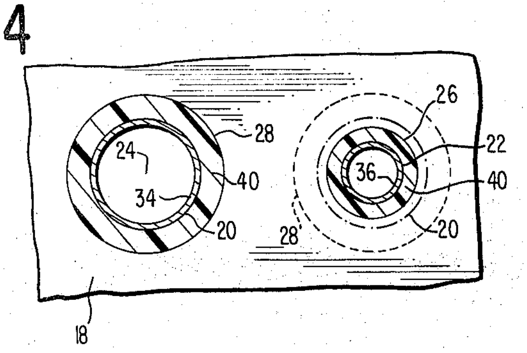
FIG. 4 is a partial sectional view taken along line 4—4 of FIG. 3.
Figure 5:
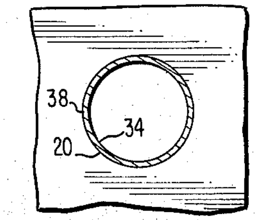
FIG. 5 is a sectional view taken along line 5—5 of FIG. 3.

Three of the possibilities for positively making or not making or selectively making the electrical connections are shown in FIGS. 4 and 5. In the left-hand side of FIG. 4 a large diameter hole 20 has been drilled on center 24 but the conductive pattern of layer 18 includes a large diameter void 28 and thus there is an annular space 40 of insulating material so that when a conductive lining 34 is placed in the hole 20 it will not make electrical connection with the conductive material of pattern 18.

Referring to FIG. 5, in the next lower layer 16 at hole 20 the conductive material extends to within the outside of the largest diameter hole 20 and, therefore, the lining 34 of the hole 20 makes electrical connection at 38 to this internal layer.

Referring now to the right-hand side of FIG. 4, a small diameter hole 22 has been drilled but the conductive pattern includes a small diameter void 26 so that there is still an annular space of insulating material 40 separating lining 36 of the small diameter hole and the conductive material pattern. The phantom line 20 shows what would have happened if a larger diameter hole 20 had been drilled on the same center, that is the larger diameter hole would have intersected the conductive pattern outside of the void diameter 26 so that lining 36 would have made the electrical connection. On the other hand, dotted line 28 shows what would have happened if there were a larger diameter void 28 such as on layer 17 and a large diameter hole 20; this results in the same condition as in the left-hand side of FIG. 4.

Around the axis of some of the holes there is a circuit pattern configuration including the semicircular void 44 of small diameter and the semicircular void 46 of larger diameter corresponding to the diameters of circular voids 26 and 28 and with the same results. That is, when a large diameter hole 20 is drilled on the axis 24, it will allow electrical contact by means of the hole lining with the conductive pattern on the small diameter semicircle 44 while not making contact on the large void 46. Thus, the conductive pattern from the hole will be only to the configuration on one side of the hole. In the pattern shown in FIG. 2, the conductive material inside the lines 32 would only be electrically connected by a small diameter hole 22 drilled into center pattern 30 or by large diameter holes 20 drilled on any of the axes having the small diameter voids 26. This would also provide an electrical connection across the void line 32 in a given plane, thus providing added flexibility. The connection would not be made even by large diameter holes 20 on any of the axes having the large diameter voids 28 or to the large diameter semicircular voids 46. The pattern including the void lines 32 and semicircular voids 46 and 44 allow for the distribution of a number of different signal voltages.

The holes 20 and 22 may be drilled in two separate steps, first drilling all one size hole and then drilling the other size hole by gang drills. The linings 34 and 36 may be placed in all of the holes simultaneously by electroplating or the like. After the holes are electroplated a top conductive layer 42 may be etched to provide the desired pattern, the components 12 inserted and electrically connected by dip soldering or other known techniques. It is not necessary to connect top layer 42 to the internal planes at all holes; in other words, the principles of this invention can be used for selectively connecting internal planes only.

The internal planes can provide for the distribution of a number of different voltages plus ground and signals, and by the use of standard internal planes, selective connections may be made by merely choosing the diameter of holes drilled on centers 24, there being a hole drilled on each center. With this arrangement it has been possible to reduce the number of internal planes by a factor of 10 to 1 while still providing the same number of circuits. This has resulted in a tremendous saving in time, expense and effort.

Figure 6:
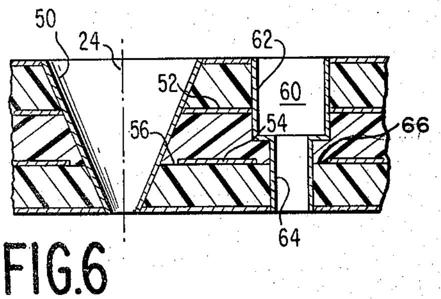
FIG. 6 is a sectional view taken through a card and illustrating further embodiments of the invention.

The embodiments shown in FIG. 6 further illustrate the flexibility of the selective connecting techniques of this invention. The left side of FIG. 6 shows a conically tapered hole 50 drilled on center 24 and tapering from one surface to the other. The size of the tapered hole is chosen so as to intercept conductive layer 52 having a void around hole 24 of lesser diameter than the diameter of the tapered hole. However, the conically tapered hole 50 will not intersect conductive layer 54 even though void 56 around center 24 may be the same size as the void in layer 52.

The right-hand side of FIG. 6 illustrates the principles of the invention utilizing a stepped diameter hole to provide selectivity. The upper portion 62 of hole 60 has a larger diameter to selectively intersect conductive layer 52. However, the lower portion 64 of hole 60 has a smaller diameter which does not intersect void 66 in conductive layer 54. As in the previously described embodiments, the holes are lined with conductive material.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A method of making selected circuit connections to internal layers of a multilayer circuit board, each layer including a layer of insulating material having conductive material on the surface thereof, a method comprising:

(a) arranging the conductive material in a predetermined pattern on at least the internal layers of said multilayer circuit board with the conductive material on each layer having a void therein of different diameter than the voids in the conductive material on each of the other layers, (b) laminating a circuit board from a plurality of layers with the midpoints of the diameters of said voids in alignment along an axis normal to said board, (c) making a hole through said board on said axis of a pre-selected size to selectively intersect the conductive material on an internal layer where the void in the conductive material on said internal layer has a diameter less than the diameter of said hole, (d) and lining said hole with an electrically conductive material thereby electrically connecting the layers of conductive material which have voids therein of a diameter less than the diameter of the hole with the lining of said hole.

2. A method as defined in claim 1 wherein the lining of the hole is accomplished by electroplating.

3. A method of making selected circuit connections to internal layers of a multilayer circuit board, each layer including a layer of insulating material having conductive material on the surface thereof, the method comprising:

(a) arranging the conductive material in a predetermined pattern on at least the internal layers of said multilayer circuit board with the conductive material on each layer having a void therein of equal diameter with the voids in the conductive material on each of the other layers, (b) laminating a circuit board from a plurality of layers with the midpoints of the diameters of said voids being in alignment along an axis normal to said board, (c) making a hole of varying diameter through the multilayer circuit board and located on said axis with a larger diameter portion of said hole intersecting one layer of conductive material and a smaller diameter section of said hole passing through the void in another conductive layer and spaced from the surrounding conductive material, (d) and lining the hole with an electrically conductive material to electrically connect the intersected layer of conductive material with the lining of the hole.

4. A method as defined in claim 3 wherein the lining of the hole is accomplished by electroplating.

5. A multilayer circuit board having selective connections to internal layers thereof comprising:

(a) multiple circuit board layers each comprising a layer of insulating material having a circuit configuration of electrically conductive material on the surface thereof, said layers being laminated together, said conductive material on at least each of said internal layers having a void therein equal in size to the voids in the conductive material on each of the other of said layers, said voids being aligned along a selected axis normal to said board, a hole extending through the multilayer circuit board on said axis, said hole being of varying diameter along said axis, said hole at a relatively large diameter portion thereof intersecting the conductive material defining one of said voids on one of said internal layers, said hole at a relatively small diameter portion thereof passing through an aligned void in the conductive material on another of said layers and being spaced from the surrounding conductive material, and conductive material lining said hole to make a selective electrical connection with at least one of the internal layers of conductive material.

6. A circuit board as defined in claim 5 wherein said hole is a conically tapered hole.

7. A circuit board as defined in claim 5 wherein said hole has a stepped diameter.

8. A circuit board as defined in claim 5 wherein each of said voids is defined by a semicircular notch in the edge of the layer electrically conductive material.

References Cited by the Examiner

UNITED STATES PATENTS

| | | | |
|---|---|---|---|
| 2,990,310 | 6/1961 | Chan | 174—68.5 |
| 3,102,213 | 8/1963 | Bedson et al. | 174—68.5 |

FOREIGN PATENTS

| | | |
|---|---|---|
| 1,256,632 | 2/1961 | France. |

ROBERT K. SCHAEFER, *Primary Examiner.*

D. L. CLAY, *Examiner.*